(12) United States Patent
Crowe

(10) Patent No.: US 11,089,340 B2
(45) Date of Patent: Aug. 10, 2021

(54) APPARATUS AND METHOD FOR AGGREGATING VIDEO STREAMS INTO COMPOSITE MEDIA CONTENT

(71) Applicant: AT&T Intellectual Property I, L.P., Atlanta, GA (US)

(72) Inventor: Keith Crowe, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/245,824

(22) Filed: Jan. 11, 2019

(65) Prior Publication Data

US 2019/0149853 A1 May 16, 2019

Related U.S. Application Data

(63) Continuation of application No. 15/223,419, filed on Jul. 29, 2016, now Pat. No. 10,219,008.

(51) Int. Cl.
*H04N 21/218* (2011.01)
*H04N 21/2187* (2011.01)
(Continued)

(52) U.S. Cl.
CPC ... *H04N 21/21805* (2013.01); *H04N 5/23238* (2013.01); *H04N 21/2187* (2013.01);
(Continued)

(58) Field of Classification Search
CPC .......... H04N 21/26208; H04N 7/1675; H04N 7/17318; H04N 21/2393
(Continued)

(56) References Cited

U.S. PATENT DOCUMENTS 7,479,967 B2  1/2009  Bachelder et al.
8,171,516 B2  5/2012  Tischer et al.
(Continued)

FOREIGN PATENT DOCUMENTS

CN    101247513 A    8/2008

OTHER PUBLICATIONS

RTI Announces Commercial Launch of 360—Degree Live—Streaming Camera Systems and Proprietary Software, Jan. 13, 2015, 2015.
(Continued)

*Primary Examiner* — Alfonso Castro
(74) *Attorney, Agent, or Firm* — Guntin & Gust, PLC; Atanu Das

(57) ABSTRACT

Aspects of the subject disclosure may include, for example, receiving a plurality of live video streams from a plurality of communication devices, the plurality of live video streams being associated with a common event. Further aspects may include aggregating the plurality of live video streams to generate a composite video stream for presenting a selectable viewing of the common event and providing the composite video stream to a device for presentation. Additional aspects may include adjusting the composite video stream according to user generated-input to generate an adjusted composite video stream, the user-generated input corresponds to a request to adjust the presentation of the common event. Other aspects may include providing the adjusted composite video stream to the device for presentation. Other embodiments are disclosed.

20 Claims, 8 Drawing Sheets

(51) Int. Cl.

| | |
|---|---|
| *H04N 21/2365* | (2011.01) |
| *H04N 21/472* | (2011.01) |
| *H04N 21/2343* | (2011.01) |
| *H04N 21/43* | (2011.01) |
| *H04N 21/431* | (2011.01) |
| *H04N 21/81* | (2011.01) |
| *H04N 21/2543* | (2011.01) |
| *H04N 21/414* | (2011.01) |
| *H04N 21/4223* | (2011.01) |
| *H04N 5/232* | (2006.01) |

(52) U.S. Cl.
CPC ... *H04N 21/2365* (2013.01); *H04N 21/23439* (2013.01); *H04N 21/2543* (2013.01); *H04N 21/41407* (2013.01); *H04N 21/4223* (2013.01); *H04N 21/4307* (2013.01); *H04N 21/4316* (2013.01); *H04N 21/47205* (2013.01); *H04N 21/47211* (2013.01); *H04N 21/816* (2013.01)

(58) Field of Classification Search
USPC .......................................................... 725/59
See application file for complete search history.

(56) References Cited

U.S. PATENT DOCUMENTS

| | | | |
|---|---|---|---|
| 8,355,041 | B2 | 1/2013 | Chen et al. |
| 8,754,924 | B1 | 6/2014 | Shane |
| 8,942,179 | B2 | 1/2015 | Cohen et al. |
| 8,964,646 | B2 | 2/2015 | Cohen et al. |
| 9,055,189 | B2 | 6/2015 | Su |
| 2004/0023722 | A1 | 2/2004 | Vuong et al. |
| 2009/0113489 | A1 | 4/2009 | O'Neil et al. |
| 2010/0079670 | A1* | 4/2010 | Frazier ............... H04N 5/44591 348/564 |
| 2010/0115575 | A1 | 5/2010 | Yu |
| 2010/0154023 | A1 | 6/2010 | Dey et al. |
| 2011/0023073 | A1 | 1/2011 | McCarthy et al. |
| 2011/0065428 | A1 | 3/2011 | Schroeter et al. |
| 2011/0296459 | A1* | 12/2011 | Medina ................ H04N 5/232 725/37 |
| 2012/0131110 | A1 | 5/2012 | Buyukkoc et al. |
| 2013/0034306 | A1 | 2/2013 | Ivanov et al. |
| 2013/0046847 | A1 | 2/2013 | Zavesky et al. |
| 2013/0093897 | A1* | 4/2013 | Fan ...................... H04N 7/181 348/159 |
| 2013/0128947 | A1 | 5/2013 | Fryer et al. |
| 2014/0122656 | A1 | 5/2014 | Baldwin et al. |
| 2014/0150032 | A1* | 5/2014 | Pacor ............... H04N 21/21805 725/62 |
| 2014/0160251 | A1 | 6/2014 | Halamish et al. |
| 2014/0267555 | A1 | 9/2014 | Shane et al. |
| 2015/0040165 | A1* | 2/2015 | Zajac .................... H04N 7/181 725/59 |
| 2016/0100110 | A1* | 4/2016 | Mate ................. G06K 9/00624 348/218.1 |
| 2016/0247537 | A1 | 8/2016 | Ricciardi |
| 2016/0330408 | A1* | 11/2016 | Costanzo ............ H04L 65/4084 |
| 2017/0070560 | A1 | 3/2017 | Eng et al. |
| 2017/0251204 | A1* | 8/2017 | Gupte ................ H04N 19/154 |
| 2018/0035136 | A1 | 2/2018 | Crowe |

OTHER PUBLICATIONS

RTI Announces Commercial Launch of 360—Degree Live—Streaming Camera Systems and Proprietary Software, Jan. 13, 2015.

* cited by examiner

500

400

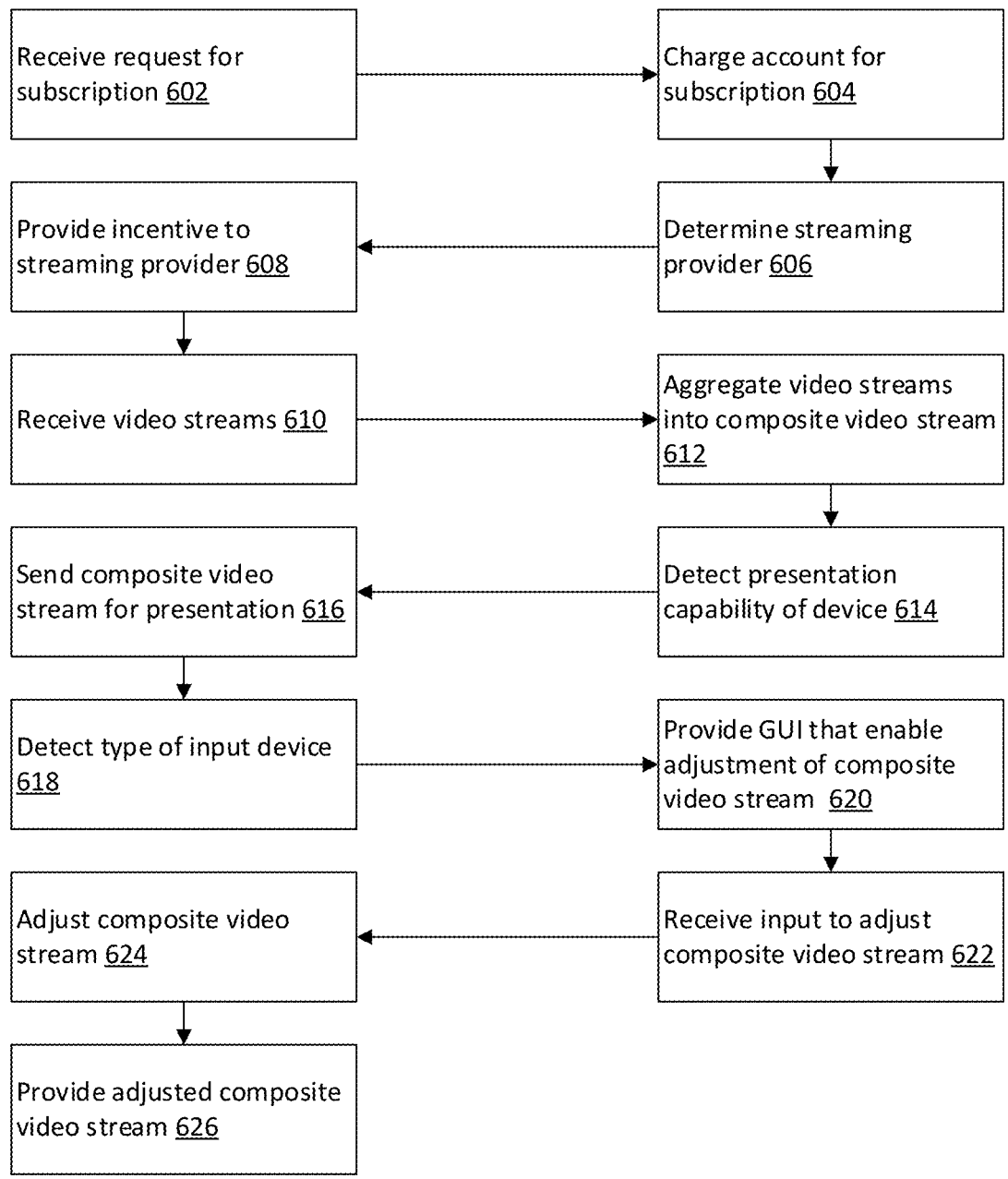

700

APPARATUS AND METHOD FOR AGGREGATING VIDEO STREAMS INTO COMPOSITE MEDIA CONTENT

CROSS-REFERENCE TO RELATED APPLICATIONS

This application is a continuation of U.S. patent application Ser. No. 15/223,419 filed Jul. 29, 2016. The contents of each of the foregoing are hereby incorporated by reference into this application as if set forth herein in full.

FIELD OF THE DISCLOSURE

The subject disclosure relates to an apparatus and method for aggregating video streams to generate composite media content

BACKGROUND

The modern Internet includes broadband, high speed networks that can carry large amounts of media content across networks. Further, the networks can include databases to store the media content. The benefits of the high speed networks include allowing individuals to provide streaming live video from portable communication devices to others via the networks. Further benefits include archiving the live streaming video for later playback.

BRIEF DESCRIPTION OF THE DRAWINGS

Reference will now be made to the accompanying drawings, which are not necessarily drawn to scale, and wherein:

FIG. 6 depicts an illustrative embodiment of a method used in portions of the system described in FIGS. 1-5 for aggregating video streams to generate composite media content and delivering composite media content to subscribers;

DETAILED DESCRIPTION

Figure 1:
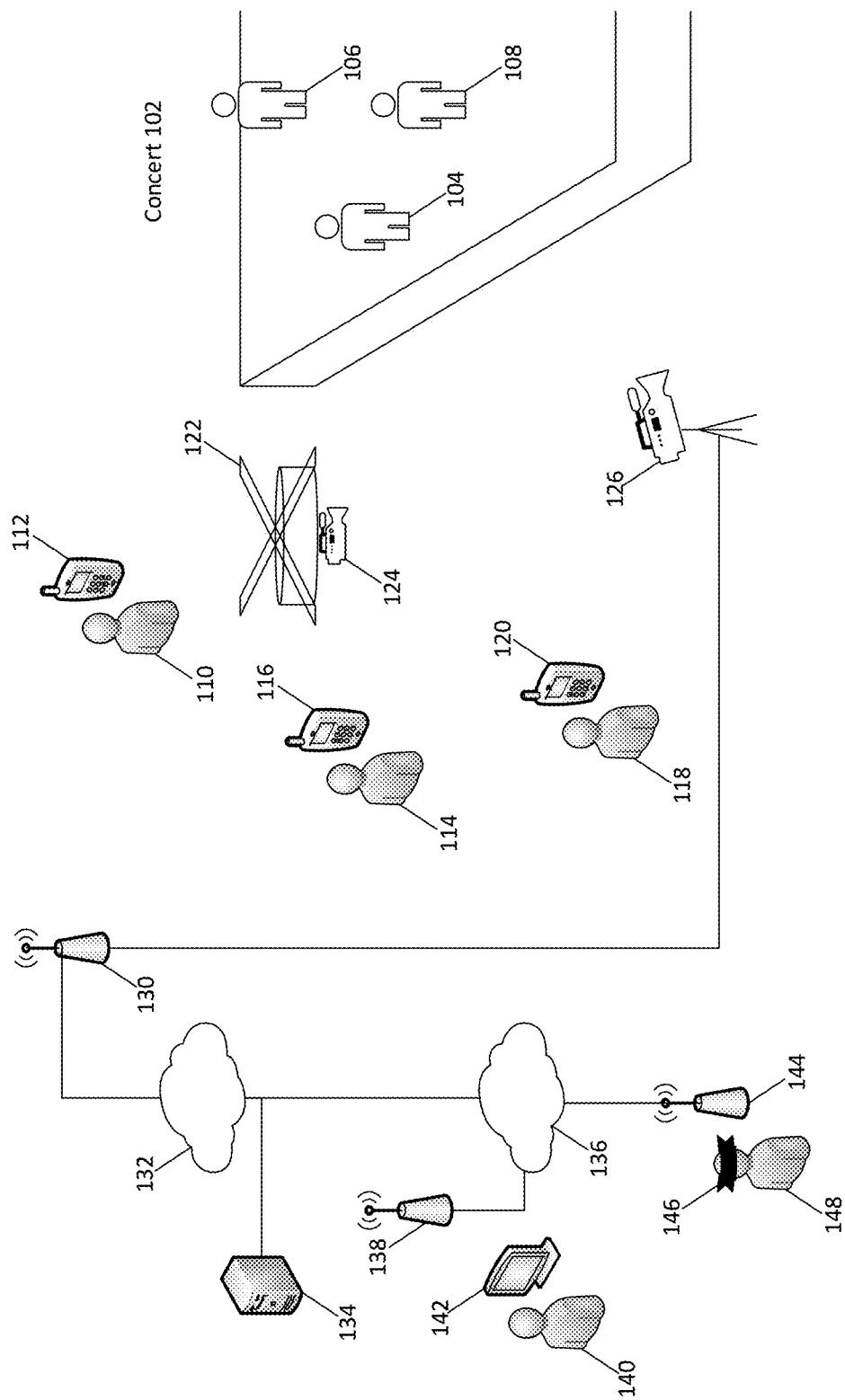
FIG. 1 depicts an illustrative embodiment of a system for aggregating video streams to generate composite media content and delivering the composite media content to subscribers.

The subject disclosure describes, among other things, illustrative embodiments aggregating video streams to generate composite media content, such as a composite video stream. This includes obtaining a live video stream from each of a multiple communication devices resulting in multiple live video streams. The live video streams can be associated with a common event. Further, the live video streams can be aggregated to generate composite video stream for presenting a selectable viewing of the common event. The composite video stream is sent to a device for presentation of the common event. Further, the composite video stream can be adjusted according to user generated-input received via a graphical user interface to generate an adjusted composite video stream. The adjusted composite video stream can be provided to the device for presentation. Other embodiments are described in the subject disclosure.

One or more aspects of the subject disclosure include a system comprising a processing system including a processor and a memory that stores executable instructions that, when executed by the processing system, facilitate performance of operations. The operations can include obtaining a live video streams from a plurality of communications device resulting in a plurality of live video streams, the plurality of live video streams being associated with a common event. The processing system can further facilitate performance of operations including aggregating the plurality of live video streams to generate a composite video stream for presenting a selectable viewing of the common event. In addition, the processing system can facilitate performance of operations including sending the composite video stream to a device for presentation of the composite video stream of the common event at the device. Also, the processing system can facilitate performance of operations including providing a graphical user interface to the device. The graphical user interface is presented by the device with the presentation of the common event. Also, the graphical user interface enables adjustment of a viewing of the common event. Further, the processing system can facilitate performance of operations including receiving user-generated input from the device. The user-generated input corresponds to a request to adjust the presentation of the common event. Additionally, the processing system can facilitate performance of operations including adjusting the composite video stream according to the user generated-input to generate an adjusted composite video stream. Each image of the adjusted composite video stream includes a selected object within the common event. The processing system can also facilitate performance of operations including providing the adjusted composite video stream to the device for presentation of adjusted composite video stream of the common event at the device.

One or more aspects of the subject disclosure include a machine-readable storage medium, comprising executable instructions that, when executed by a processing system including a processor, facilitate performance of operations. The operations can include receiving a plurality of live video streams from a plurality of communications device, the plurality of live video streams being associated with a common event. The executable instructions can further facilitate performance of operations aggregating the plurality of live video streams to generate a composite video stream for presenting a selectable viewing of the common event. The executable instructions can further facilitate the operations for generating a 360 degree live virtual environment from the composite video stream. In addition, the executable instructions can facilitate performance of operations providing the 360 degree live virtual environment to a device for presentation of the 360 degree live virtual environment of the common event at the device. Also, the executable instructions can facilitate performance of operations adjusting the composite video stream according to user generated-input to generate an adjusted composite video stream and an adjusted a 360 degree live virtual environment responsive to receiving the user-generated input from the device. The user-generated input corresponds to a request to adjust the presentation of the common event. Further, the executable instructions can facilitate performance of operations providing the adjusted 360 degree live virtual environment to the device for presentation of the adjusted 360 degree live virtual environment of the common event at the device.

One or more aspects of the subject disclosure includes a method. The method can include obtaining, by a processing system including a processor, a live video stream from each of a plurality of communication devices resulting in a plurality of live video streams, the plurality of live video streams being associated with a common event. The method can further include aggregating, by the processing system, the plurality of live video streams to generate a composite video stream for presenting a selectable viewing of the common event. In addition, the method can include transmitting, by the processing system, the composite video stream to a device for presentation of the composite video stream of the common event at the device. Also, the method can include adjusting, by the processing system, the composite video stream according to user generated-input to generate an adjusted composite video stream responsive to receiving the user-generated input from the device. The user-generated input corresponds to a request to adjust the presentation of the common event. Further, the method can include providing, by the processing system, the adjusted composite video stream to the device for presentation of adjusted composite video stream of the common event at the device.

FIG. 1 depicts an illustrative embodiment of a system 100 for aggregating video streams to generate composite media content and delivering the composite media content to subscribers. In one or more embodiments, the system 100 can be used for an event 102 such as a concert. The concert event 102 can be for a musical group with three members, a singer 104, guitarist 106, and bassist 108. The operator of the concert venue can have a fixed camera 126 and drone 122 with a camera 124 each capturing a live video stream of the concert event 102. Further, concert attendees 110, 114, and 118 each may have a communication device 112, 116, and 120 to capture a live video stream of the event 102. The communication devices 112, 116, and 120 can include, but is not limited to, cameras, camera-enabled mobile phones, camera-enabled tablet computers, camera-enabled laptop computers, or any other computing device. The captured live video streams can be transmitted to an access point 130 over a communication network 132.

In one or more embodiments, the fixed camera 126 can be communicatively coupled to the access point via a wired connection. Further, communication devices 112, 116, and 120 as well as the camera 124 on the drone 122 can be communicatively coupled to the access point 130 wirelessly. The captured live video streams are provided to a media content server 134 over communication network 132. The concert attendees 110, 114, and 118 as well as the concert venue operator that controls fixed camera 128 and the camera 124 of the drone 122 are streaming providers for providing captured live video streams to media content server 134.

In one or more embodiments, prior to, during, or after the event 102, subscribers 140 and 148 can request a subscription for viewing the event 102 at a commercial or residential premises. That is, the communication devices 112, 116, 120, 124, and 126 can provide live video streams of the event 102 to the media content server 134 but they can also provide recorded video streams of the event 102.

The media content server 134 can charge or cause another network device (e.g. billing server) to charge an account associated with subscribers 140 and 148 for the subscription to view the event 102. Further, the request for the subscription to view the event 102 can be part of tiered subscription service associated with the subscribers 140 and 148.

In other embodiments, prior to event or during the event 102 media content server 134 determines a streaming provider 110, 114, and 118 associated with each communication device 112, 116, and 120. Further, the media content server 134, as directed by an operator of the media content server 134, can provide an incentive to a streaming provider 110, 114, and 118 to provide captured a live video stream of the event 102. The incentive can be a discount or free subscription for viewing a future event from the streaming provider's premises. Another incentive can be that the media content server operator providing the streaming provider 110, 114, and 118 access to increased bandwidth over a period of time. An additional incentive can be monetary compensation for providing the captured live video stream of the event 102.

In one or more embodiments, the streaming providers can send the live video streams from their communication devices 112, 116, 120, 124, and 126 on social media server to be shared with other social media members. Further, the composite video stream and virtual environment generated from the composite video stream can be sent to a social media server to be shared with other social media members.

In one or more embodiments, the media content server 134 obtains the captured live video streams from communication devices 112, 116, 120, 124, and 126 of event 102. Further, the media content server 143 can aggregate the captured video streams to generate a composite video stream for presenting a selectable viewing of the event 102. In addition, the media content server 134 sends the composite video stream to one or more devices 142 and 146 associated with subscribers 140 and 148 for presentation of the composite video stream of the event 102. In some embodiments the composite video stream is sent live or nearly in real-time (taking into account aggregation, processing, and/or transmission delays). In other embodiments, the live video streams are stored for later aggregation to generate a recorded composite video stream. In additional embodiments, the video streams provided by the communication devices 112, 116, 120, 124, and 126 are recorded by streaming providers and are aggregated by the media content server 134 to generate a recorded composite video stream.

In one or more embodiments, the composite video stream can be delivered to a device 142 over communication network 136 to access point 138. Device 142 can be communicatively coupled wirelessly or via a wired connection to access point 138. Further, the device 142 can be a display that can present standard definition or high definition television signals as well as two dimensional or three dimensional media content (e.g. image or video content) to a subscriber 140. In addition, the device 142 can be a display that can provide holographic images or a virtual reality environment (e.g. 360 degree live virtual environment) to subscriber 140.

In one or more embodiments, the composite video stream can be delivered to a device 146 over a communication network 136 to an access point 144. The device 146 can be communicatively coupled wirelessly or via a wired connection to an access point 144. Further, the device 146 can be a virtual reality headset that displays holographic or a virtual reality environment (e.g. 360 degree live virtual environment) to a subscriber 148.

In one or more embodiments, prior to delivering the composite video stream to devices 142 and 146, the media content server 134 can send the devices 142 and 146 each a request for their respective presentation capability or range of presentation capabilities (e.g. standard definition, high definition, ultra-high definition television signals, two dimensional/three dimensional media content, holographic images, and virtual reality environment). The devices 142 and 146 provide a response to the request, the response can include the devices 142 and 146 presentation capabilities or range of presentation capabilities. The response can be in the form of a message or signal. In addition, the media content server 134 can periodically poll the devices 142 and 146 for their presentation capabilities and receive a response from the devices 142 and 146 to detect the presentation capabilities of the devices 142 and 146.

In one or more embodiments, the media content server 134 can provide each device 142 and 146 a graphical user interface to be presented with the presentation of event 102. The graphical user interface enables adjustment of a viewing of the event 102. In some embodiments, each device 142 and 146 can be communicatively coupled to one or more input devices. Prior the providing the graphical user interface, the media content server 134 can send the devices 142 and 146 each a request for the types of input devices coupled to the devices 142 and 146. The devices 142 and 146 can provide a response to the request, the response can include the type of input devices coupled to device 142 and 146. The response can be in the form of a message or signal. In addition, the media content server 134 can periodically poll the devices 142 and 146 to provide the type of input devices coupled to them and receive a response from the device 142 and 146 to detect the input devices coupled to devices 142 and 146, accordingly. For example, the device 142 can coupled to input devices including a keyboard, mouse, game controller, joystick, touchscreen, voice recognition, etc. Thus, the media content server 134 can provide a graphical user interface that can accept input from such input devices. As another example, the device 146 can be coupled to input devices such as finger wearing gesture detecting sensors, sensors on a virtual reality headset 146 that detect head and body movement. Hence, the media content server 134 can provide a graphical user interface that can accept input from such input devices.

In or more embodiments, the media content server 134 can receive user generated input via the graphical user interface to generate an adjusted composite video stream. Further, the adjusted composite video stream can be provided by the media content server 134 to the devices 142 and 146 for presentation. The adjusted composite video stream can be live (or nearly real-time taking into account to aggregation, adjustment, and transmission delays) or a buffered/recorded video stream.

Figure 2:
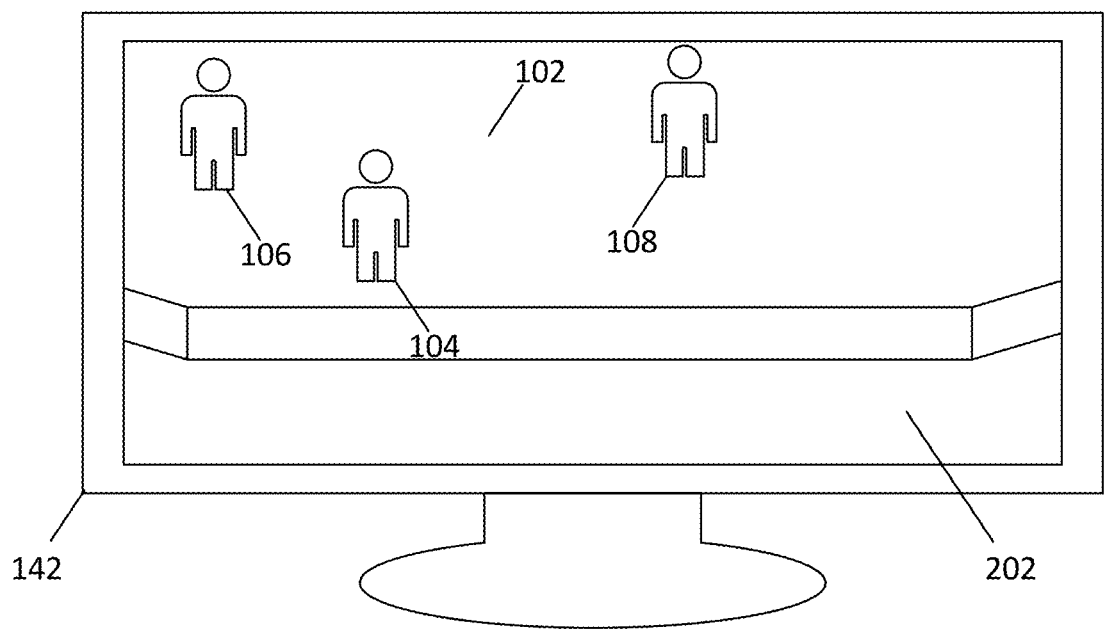
FIGS. 2-3 depicts illustrative embodiments of systems for delivering composite media content to a device associated with a subscriber.
Figure 3:
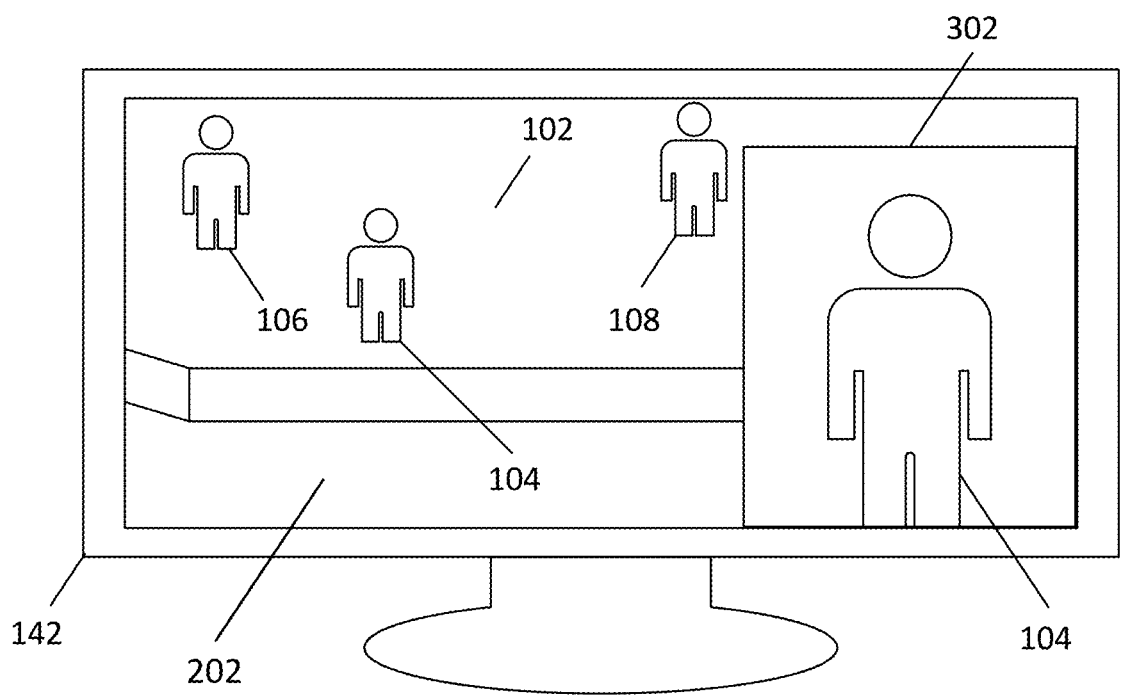

FIGS. 2-3 depict illustrative embodiments of a system 200 and 300 for delivering composite media content 202 such as a composite video stream to a device 142 associated with a subscriber 140. Further, the composite video stream can be displayed according to one of the presentation capabilities of the device 142 that can include standard definition, high definition, ultra-high definition television signals, two dimensional/three dimensional media content, holographic images, and virtual reality environment. In addition, a subscriber 140 can view the concert event 102 of the musical group including the singer 104, guitarist 106, and bassist 108. Also, the device 142 can present a graphical user interface provided by the media content server 134 depending on the type of input devices communicatively coupled to the device 142. For example, the device 142 can have a touchscreen that is an input device. The graphical user interface presented with the composite video stream 202 can be compatible to receiving input from a touchscreen. Moreover, the subscriber 140 may desire to see a different view of the composite video stream 202. For example, the subscriber may desire to see a magnified view of the singer 104. Further, the display of 142 can be enabled with touchscreen input capability such that the subscriber 144 can touch the display near the image of the singer 104 and use a gesture to magnify or otherwise adjust the image. Thus, the gesture input is detected by the touchscreen and recognized as an input to adjust or magnify portion of the composite video stream during presentation. Such input can be delivered to the media content server 134.

Referring to FIG. 3, the media content server 134 can receive input from the subscriber 140, adjust the composite video stream according to the input, and provide the adjusted composite video stream 302 for presentation at the device 142. For example, device 142 can have touchscreen capability. The subscriber 144 can touch the display near the image of the singer 104 and use a gesture to magnify or otherwise adjust the image. Thus, the gesture input is detected by the touchscreen and recognized as an input to adjust or magnify portion of the composite video stream during presentation. Such input can be delivered to the media content server 134. Further, the media content server 134 can adjust the composite video stream according to the input. That is, the media content server 134 can adjust the composite video stream to be an adjusted composite stream that includes a magnified or adjusted view of the singer 104 of the concert event 104. The adjusted composite video is provided to the device 142. In addition, the device 142 presents the adjusted composite video stream 302. The device 142 can be configured or instructions can be given, either by input provided by the subscriber or by the media content server 134 to replace the composite video stream 202 with the adjusted composite video stream. Alternatively, the device 142 can be configured or instructions can be given, either by input provided by the subscriber or by the media content server 134 to overlay the adjusted composite video stream 302 onto the composite video stream 202. This type of presentation can be called a picture-in-picture presentation with the adjusted composite video stream 302 overlaid on the composite video stream 202. Further, the adjusted composite video stream 302 can be presented side-by-side with the composite video stream.

In one or more embodiments, the subscriber 140 can use the touchscreen input device of device 142 to magnify or adjust the view of two members of the musical group (e.g. singer 104 and guitarist 106) using one or more gestures while contacting the display. That is, the subscriber provides one input to magnify or adjust the view of one group member and another input to magnify or adjust the view of another group member. Thus, the device 142 provides the media content server 134 with both inputs, and the media content server 134 adjusts the composite video stream in two different ways, one according to the first input and one according to a second input. Thereafter, the media content server 134 can generate two adjusted composite video streams each according to an input. Further, the media content server 134 can generate multiple adjusted composited video streams responsive to multiple inputs.

In some embodiments, the media content server 134 can provide the multiple adjusted composite video streams to the device 142. In addition, the device 142 can present the multiple adjusted composite video streams side-by-side. Further, one adjusted composite video stream can be overlaid on another adjusted composite video stream. In addition, the multiple adjusted composite video streams can be overlaid on the (unadjusted) composite video stream.

In one or more embodiments, the media content server 134 aggregates the live video streams provided by communication devices 112, 116, 120, 124, and 126. The media content server 134 can select a portion of the live video streams from communication devices 112, 116, 120, 124, and 126 to aggregate to generate the composite video stream. For example, two or more communication devices may provide the same or similar perspective of the event 102 such that aggregating the both into the composite video stream add marginal value. Further, one of the streaming providers may request a higher value incentive than another streaming provider. Thus, the media content server 134 may choose to aggregate the live video stream from a communication device associated with a streaming provider that requests a lower value incentive if both live video streams are from similar perspectives of the event 102. In addition, the communication devices that provide live video streams with similar perspectives of the event 102 may have captured the live video stream with different resolution or presentation capabilities. Thus, the media content server 134 may select live video streams among those with similar perspectives that have resolution and presentation capabilities that are compatible with devices 142 and 146 or those with the highest resolution or presentation capabilities.

In one or more embodiments, in response to a request to adjust the composite video stream, the media content server 134 can select a portion of live video streams from communication devices 112, 116, 120, 124, and 126 to aggregate to generate the adjusted composite video stream. In some embodiments, each image of the adjusted composite video stream can includes an image of the selected moving object. In other embodiments, the request for adjusting the composite video stream can be for an adjusted or magnified view of the singer 104 of the concert event 102. Thus, the live video streams from communication devices 116 and 124 can provide a live video streams that include a magnified view of the singer 104, for example. Further, the media content server 134 can use image processing techniques on the collected live video streams from any or all the communication devices 112, 116, 120, 124, and 126 to aggregate and generate both the composite video stream and adjusted composite video stream. That is, for example, the media content server 134 can implement image processing techniques to aggregate and generate a magnified view of the singer 104 from the live video streams collected from communication devices 116 and 124.

Figure 5:
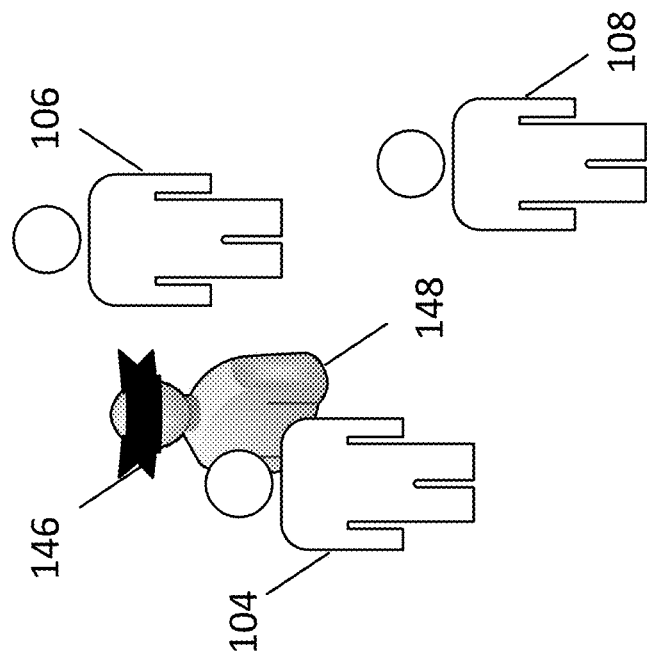
FIGS. 4-5 depicts an illustrative embodiment of a virtual environment generated from composite media content delivered to a subscriber.
Figure 4:
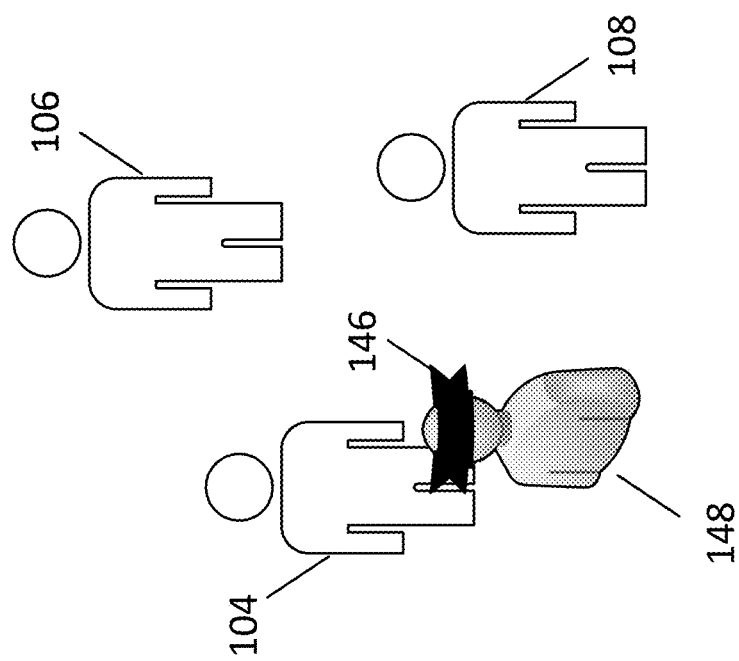

FIGS. 4-5 depicts an illustrative embodiment of a virtual environment generated from composite media content delivered to a subscriber. Referring to FIG. 4, the media content server 134 generates a virtual environment (e.g. a 360 degree, live virtual environment, recorded virtual environment, etc.) from the composite video stream and delivers the virtual environment to device 146, which can be a virtual reality headset 146. The subscriber 148 can view the virtual reality environment from the composite video stream such that the subscriber feels that she is onstage next to the singer 104 and bassist 108 of the musical group. Referring to FIG. 5, the subscriber 148 can move around her location (e.g. a room in her house) to adjust the virtual reality environment generated from the composite video stream. Sensors that detect movement and head orientation of the subscriber 148 are input devices of the virtual reality headset 146. The sensors can detect that the subscriber 148 has moved her location to have a closer, magnified, or otherwise adjusted view of the guitarist 106 (i.e. the selected object). The input sensor information is provided to the media content server 134. Further, the media content server 134 adjusts the composite video stream according to the input sensor information and generates an adjusted virtual reality environment such that the subscriber 148 can view the stage area between the singer 104 and the guitarist 106 through the virtual reality headset 146. In some embodiments, each image of the adjusted virtual reality environment can include an image of the guitarist 106 (i.e. selected object).

Although some embodiments described herein discuss an event 102 to be a concert event, a person of ordinary skill in the art would understand that the embodiments can also apply to any event. For example, at a car racing event, the composite video stream can be aggregated from multiple video streams, each of which can be from a communication device associated with a racing event attendee or a receiving venue. Further, a subscriber to the composite video stream of the car racing event can select a magnified or adjusted view of a particular race car (e.g. car no. 95) and adjust the composite video stream to provide a magnified or adjusted view of car no. 95 to the subscriber, accordingly. Thus, the subscriber can track car no. 95 individually from all the other cars participating in the racing event. In another example, at a football event, the composite video stream can be aggregated from multiple video streams, each of which can be from a communication device associated with a football game attendee or a game venue. Further, a subscriber to the composite video stream can select a magnified or adjusted view of a player (e.g. wide receiver) or object (e.g. football) and adjust the composite video stream to provide a magnified or adjusted view of player or object to the subscriber, accordingly. Thus, the subscriber can track the movements of the wide receiver individually from all the other players participating in the football game.

Other embodiments can include a security system for a public venue. For example, a security system for a football stadium may have multiple fixed and portable cameras that are within and surround the football stadium, controlled and managed by a stadium operator. Multiple live video streams from the multiple fixed and portable surveillance cameras can be sent to a security control room and a computer server can aggregate the live video streams to generate and present a composite video stream to displays in the security control room of a stadium. Security personnel can identify an attendee to a stadium event as a suspicious person. Further, security personnel can direct the security system to adjust the composite video stream to view the suspicious person. That is, the composite video stream is adjusted to track the movements of the suspicious person within and surrounding the stadium using a portion of the multiple video streams from the surveillance cameras.

FIG. 6 depicts an illustrative embodiment of a method 600 used in portions of the system described in FIGS. 1-5 for aggregating video streams into composite media content and delivering composite media content to subscribers. At step 602, a media content server 134 receives a request for a subscription for viewing an event from a device 142 and 146 associated with a subscriber 140 and 148 at a commercial or residential premises. The request for a subscription can be made at a time prior to the start, during, or after the event. Requesting a subscription can also include registering one or more presentation devices 142 and 146 from which a subscriber 140 and 148 may like to view the requested event. Further, the request for subscription may be in conjunction with subscribing for other services such as, but not limited to, cable television service, satellite television service, landline telephone service, Internet service, video on demand service, teleconferencing, and video conferencing subscribed by the subscriber 140 and 148. Thus, the request for a subscription can be made at the same time as subscribing to these other services or a portion of these services. In addition, the request for the subscription to view the event 102 can be part of tiered subscription service associated with the subscribers 140 and 148.

At step 604, the media content server 134 can charge or cause another network device (e.g. billing server) to charge an account associated with subscribers 140 and 148 for the subscription to view the event 102. Such an account can be a stand-alone account associated with the subscriber 140 and 148 for the composite video stream or an account associated with the subscriber 140 and 148 for any other services such as, but not limited to, cable television service, satellite television service, landline telephone service, Internet service, video on demand service, teleconferencing, and video conferencing.

At step 606, prior to, during, or after the event 102, media content server 134 determines a streaming provider 110, 114, and 118 associated with each communication device 112, 116, and 120. Further, at step 608, the media content server 134, as directed by an operator of the media content server 134, can provide an incentive to a streaming provider 110, 114, and 118 to provide a captured video stream of the event 102. The incentive can be a discount or free subscription for viewing a future event. Another incentive can be that the media content server operator provides the streaming provider 110, 114, and 118 access to increased bandwidth over a period of time. An additional incentive can be monetary compensation for providing the captured video stream of the event 102. Also, the media content server operator can provide a discount to other services subscribed by the streaming provider under the control of the operator such as, but not limited to, cable television service, satellite television service, landline telephone service, Internet service, video on demand service, teleconferencing, and video conferencing.

At step 610, the media content server 134 receives the multiple live video streams from multiple of communication devices, the live video streams being associated with a common event 102. In one example, the media content server receives a live video stream from each of the multiple communication devices. Further, at step 612, the media content server 134 can aggregate the live video streams to generate a composite video stream for presenting a selectable viewing of the common event 102.

At step 614, the media content server 134 detects a presentation capability of the device 142 and 146 such that the media content server 134 can aggregate the video streams to generate the composite video stream according to the presentation capability of the device. Detecting the presentation capability of device 142 and 146 can include the media content server 134 sending devices 142 and 146 each a request for their respective presentation capability or range of presentation capabilities (e.g. standard definition, high definition, ultra-high definition television signals, two dimensional/three dimensional media content, holographic images, and virtual reality environment). The devices 142 and 146 provides a response to the request, the response include the devices 142 and 146 presentation capabilities or range of presentation capabilities. The response can be in the form of a message or signal. In addition, the media content server 134 can periodic poll the devices 142 and 146 for their presentation capabilities and receive a response from the device 142 and 146 to detect the presentation capabilities of devices 142 and 146.

At step 616, media content server 134 sends the composite video stream to a device for presentation of the composite video stream of the common event at the device 142 and 146.

At step 618, the media content server 134 detects the types of input device associated with the device. The media content server 134 can send devices 142 and 146 each a request for the types of input devices associated with the devices 142 and 146. The devices 142 and 146 provides a response to the request, the response can include the devices 142 and 146 type of input devices coupled to device 142 and 146. The response can also be in the form of a message or signal. In addition, the media content server 134 can periodically poll the devices 142 and 146 to provide the type of input devices coupled to them and receive a response from the device 142 and 146 to detect the input devices coupled to devices 142 and 146, accordingly. For example, device 142 can coupled to input devices including a keyboard, mouse, game controller, joystick, touchscreen, voice recognition device, etc.

At step 620, the media content server 134 can provide a graphical user interface to the device. The graphical user interface is presented by the device with the presentation of the common event 102 and the graphical user interface enables adjustment of a viewing of the common event. Further, the media content server 134 can provide a graphical user interface that can accept input from the detected input devices associated with devices 142 and 146. As another example, device 146 can be coupled to input devices such as finger wearing gesture detecting sensors, sensors on a virtual reality headset 146 that detect head and body movement. Hence, the media content server 134 can provide a graphical user interface that can accept input from such input devices.

At step 622, media content server 134 receives user-generated input from the device 142 and 146 based on a selection provided via the graphical user interface. The user-generated input corresponds to a request to adjust the presentation of the common event 102 and can be provided via one of the detected input devices associated with the device 142 and 146.

At step 624, the media content server 134 adjusts the composite video stream according to the user generated-input to generate an adjusted composite video stream, and step 626, the media content server 134 provides the adjusted composite video stream to the device 142 and 146 for presentation of adjusted composite video stream of the common event 102 at the device 142 and 146.

Further, the providing the graphical user interface includes providing a list of selectable moving objects 104, 106, and 108 (e.g. the singer, guitarist, and bassist) within the common event 102, and receiving of the user-generated input from the device can include receiving a selected moving object 104 from the list of selectable moving objects 104, 106, and 108 within the common event 102.

In addition, adjusting of the composite video stream according to the user-generated input can include identifying a portion of the video streams that shows the selected moving object and aggregating the portion of the video streams to generate the adjusted composite video stream. Each image of the adjusted composite video stream can include an image of the selected moving object. The adjusted composite video stream provides an adjusted or magnified view of the selected moving object (e.g. singer 104), for example. In some embodiments, the adjusted composite video stream can track the movements of the selected moving object as well as provide a magnified view.

While for purposes of simplicity of explanation, the respective processes are shown and described as a series of blocks in FIG. 6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 7:
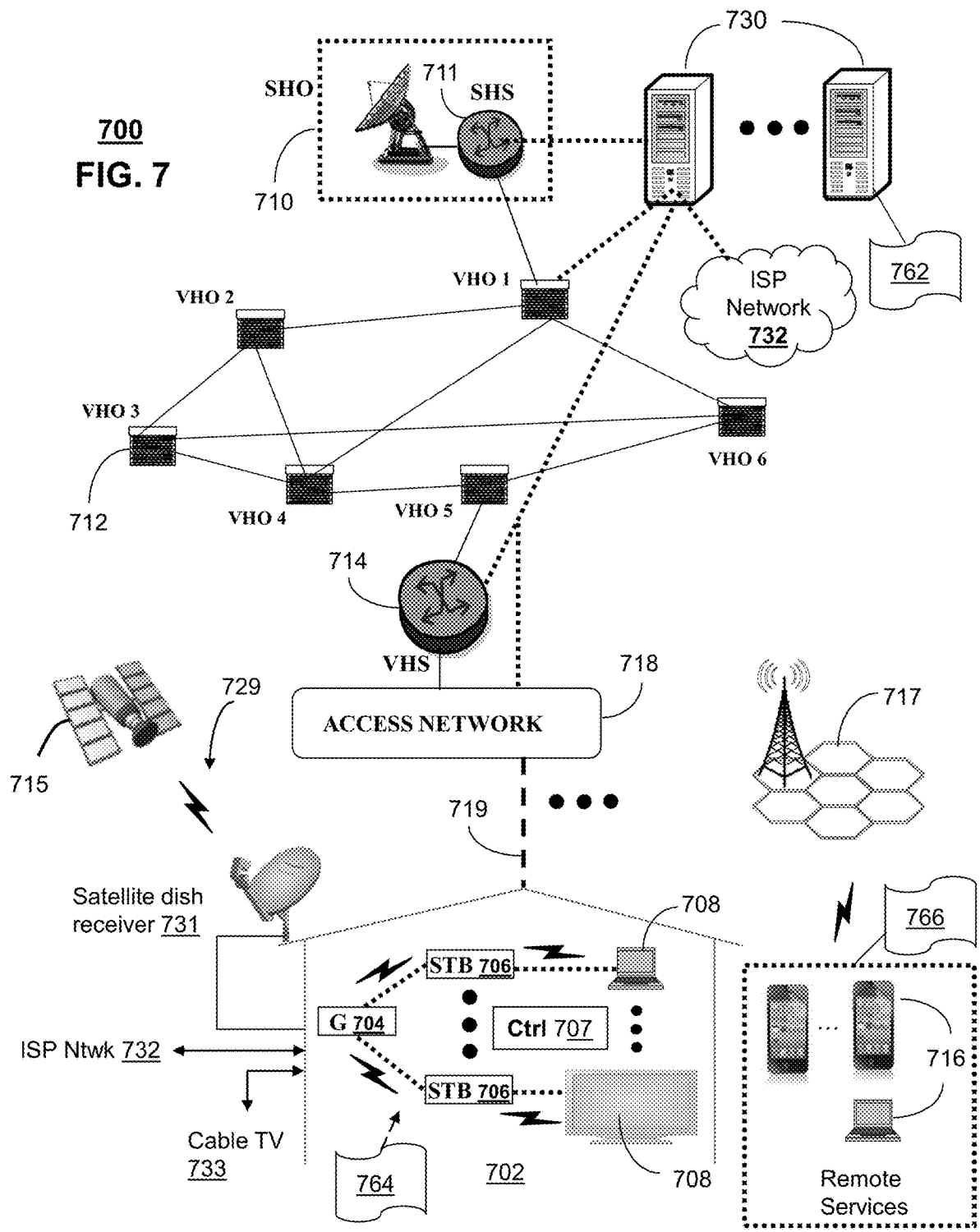
FIGS. 7-8 depict illustrative embodiments of communication systems that provide media services including aggregating video streams to generate composite media content and delivering composite media content to subscribers.

FIG. 7 depicts an illustrative embodiment of a first communication system 400 for delivering media content. The communication system 700 can represent an Internet Protocol Television (IPTV) media system. Communication system 700 can be overlaid or operably coupled with system 100 of FIG. 1 as another representative embodiment of communication system 700. For instance, one or more devices illustrated in the communication system 700 of FIG. 7 such as media content servers 730 can be media content servers as described herein as media content server 134 in FIG. 1. The media content servers 730 can implement software functions 762 to obtain live video streams from communication devices 716. The live video streams can be associated with a common event 102. Software functions 766 can assist communication devices 716 to capture and deliver video streams of the event 102 to the media content servers 730 over a cellular network 717 and other communication networks 718 and 732. The software functions 762 can aggregate the video streams to generate a composite video stream for presenting a selectable viewing of the common event 102. Further, the media content servers 730 can send the composite video stream to a device 706 and 708 associated with a subscriber for presentation of the composite video stream of the common event at the devices 706 and 708. Software functions 764 can assist in receiving and presenting the presentation of the composite video stream at devices 706 and 708. In addition, the media content servers 730 provide a graphical user interface to the devices 706 and 708. The graphical user interface is presented by the devices 706 and 708 with the presentation of the common event 102. Also, the graphical user interface enables adjustment of a viewing of the common event. The media content servers 730 receive user-generated input from at least one of the devices 706 and 708. The user-generated input corresponds to a request to adjust the presentation of the common event. Further, the media content servers 730 with software functions 762 adjust the composite video stream according to the user generated-input to generate an adjusted composite video stream. In addition, the media content servers 730 provide the adjusted composite video stream to the devices 706 and 708 for presentation of adjusted composite video stream of the common event at the devices 706 and 708.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 406 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as a media content server 730 (herein referred to as media content server 730). The media content server 730 can use computing and communication technology to perform function 762, which can include among other things, the generation techniques described by method 600 of FIG. 6. For instance, function 762 of server 730 can be similar to the functions described for server 134 of FIG. 1 in accordance with method 600. The media processors 706 and wireless communication devices 716 can be provisioned with software functions 764 and 766, respectively, to utilize the services of media content servers 730. For instance, functions 764 and 766 of media processors 706 and wireless communication devices 716 can be similar to the functions described for the communication devices 112, 116, 120, 124, and 126 as well as devices 142 and 146 of FIG. 1 in accordance with method 600.

Figure 8:
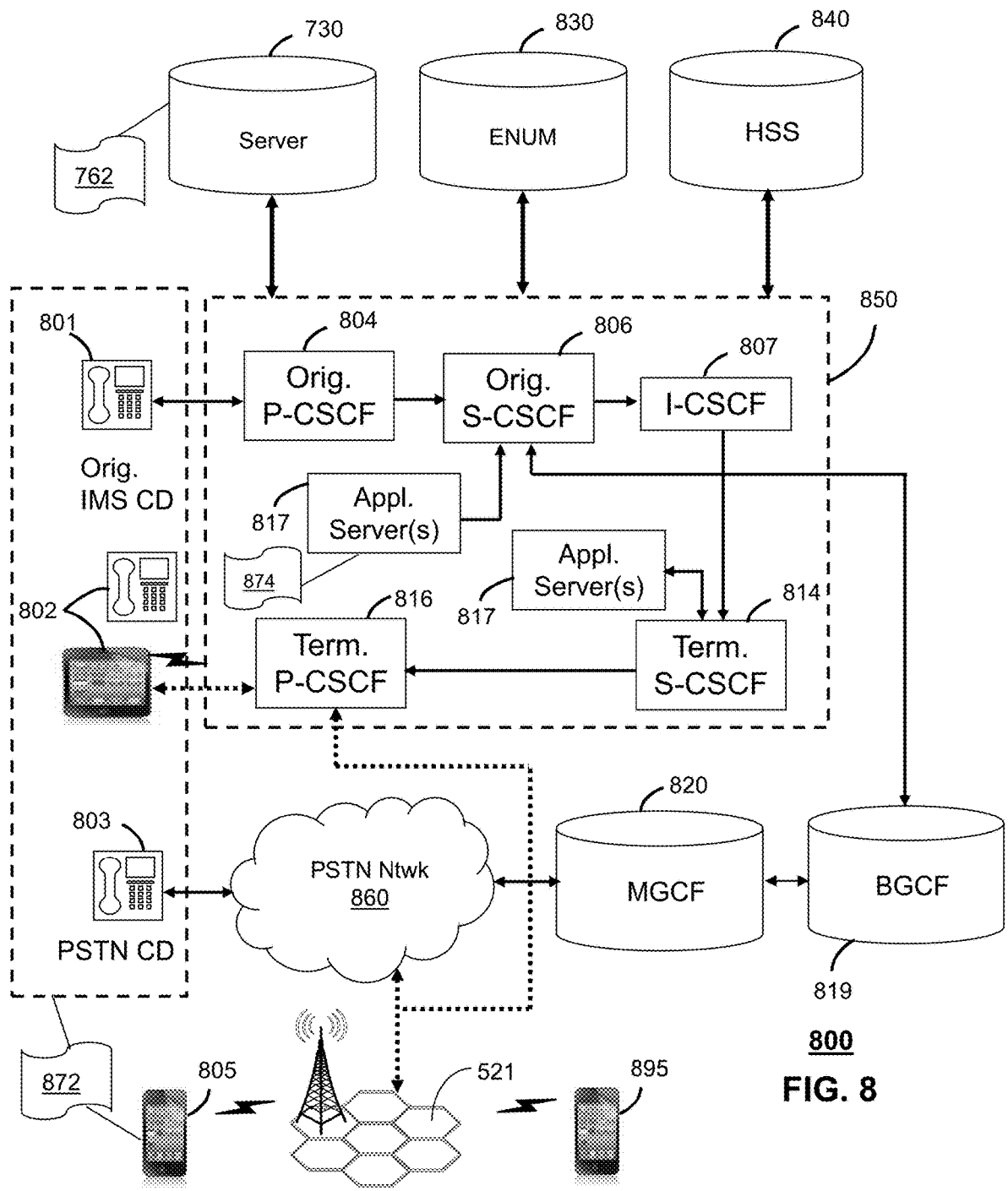

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with system 100 of FIG. 1 and communication system 700 as another representative embodiment of communication system 700.

The media content server 730 can implement software functions 762 to obtain live video streams from communication devices 805 and 895. The live video streams can be associated with a common event 102. Software functions 872 can assist communication devices 805 and 895 to capture and deliver video streams of the event 102 to the media content servers 730 over a cellular network 521 and other communication networks 860. The software functions 762 can aggregate the video streams to generate a composite video stream for presenting a selectable viewing of the common event 102. Further, the media content servers 730 can send the composite video stream to a device 802 associated with a subscriber for presentation of the composite video stream of the common event at the device 802. Software functions 864 can assist in receiving and presenting the presentation of the composite video stream at device 802. In addition, the media content server 730 can provide a graphical user interface to the device 802. The graphical user interface is presented by the device 802 with the presentation of the common event 102. Also, the graphical user interface enables adjustment of a viewing of the common event. The media content server 730 receives user-generated input from at least one of the device 802. The user-generated input corresponds to a request to adjust the presentation of the common event. Further, the media content server 730 with software functions 762 adjusts the composite video stream according to the user generated-input to generate an adjusted composite video stream and provide the adjusted composite video stream to the device 802 for presentation of adjusted composite video stream of the common event at the device 802.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 507 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media content servers 730 of FIG. 7 can be operably coupled to communication system 800 for purposes similar to those described above. Media content servers 730 can perform function 762 and thereby provide composite video stream services of and event 102 to the CDs 802 of FIG. 8 similar to the functions described for server 134 of FIG. 1 in accordance with method 600 of FIG. 6. CD 802, which can be adapted with software to perform function 874 to utilize the services of the media content server 730 similar to the functions described for communication devices 142 and 146 of FIG. 1 in accordance with method 600 of FIG. 6. Media content server 730 can be an integral part of the application server(s) 817 performing function 874, which can be substantially similar to function 762 and adapted to the operations of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
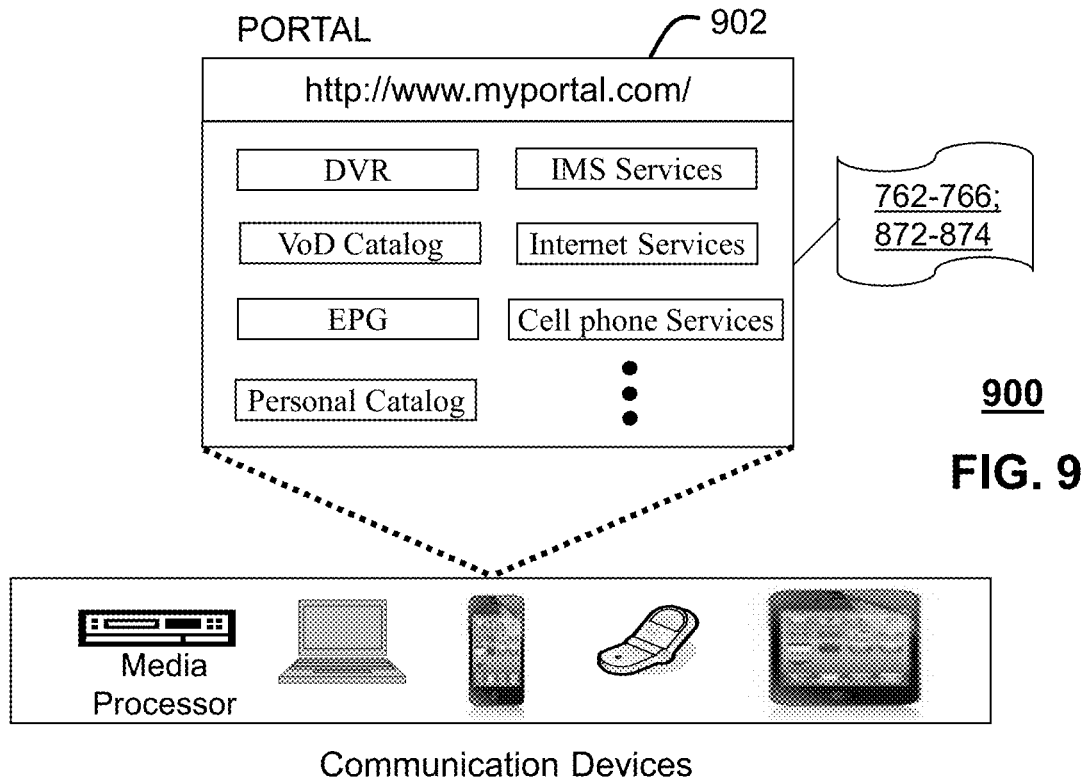
FIG. 9 depicts an illustrative embodiment of a web portal for interacting with the communication systems to subscribe for delivery of composite media content.

FIG. 9 depicts an illustrative embodiment of a web portal 902 of a communication system 900. Communication system 900 can be overlaid or operably coupled with system 100 of FIG. 1, communication system 700, and/or communication system 800 as another representative embodiment of system 100 of FIG. 1, communication system 700, and/or communication system 800. The web portal 902 can be used for managing services of system 100 of FIG. 1 and communication systems 700-800. A web page of the web portal 902 can be accessed by a Uniform Resource Locator (URL) with an Internet browser using an Internet-capable communication device such as those described in FIG. 1 and FIGS. 7-8. The web portal 902 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 902 can also be used for provisioning IMS services described earlier, provisioning Internet services, provisioning cellular phone services, and so on.

The web portal 902 can further be utilized to manage and provision software application 762 to adapt this applications as may be desired by subscribers and/or service providers of system 100 of FIG. 1, and communication systems 700-800. For instance, subscribers of the services provided by server 134 or server 730 can log into their on-line accounts and provision the server 134 or 730 with a subscription service for delivering a composite video stream for an event. Further, the subscriber may register for such a streaming service when subscribing to other services such as, but not limited to, cable television service, satellite television service, landline telephone service, Internet service, video on demand service, teleconferencing, and video conferencing. In addition, the subscriber can subscribe to the streaming service as part of a tiered service. Also, the subscriber can access the portal 902 to manage an account associated with the streaming service. In other embodiments, a streaming provider 110, 114, and 118 can use the portal to indicate that the streaming provider will deliver a video stream of an event in exchange for an incentive. The portal 902 can present a list of electable incentives from which the streaming provider can select. The incentive can be a discount or free subscription for viewing a future event from the streaming provider's premises. Another incentive can be that the media content server operator can provide the streaming provider 110, 114, and 118 access to increased bandwidth over a period of time. An additional incentive can be monetary compensation for providing the captured live video stream of the event 102. Also, the media content server operator can provide a discount to other services subscribed by the streamlining provider under the control of the operator such as, but not limited to, cable television service, satellite television service, landline telephone service, Internet service, video on demand service, teleconferencing, and video conferencing.

Service providers can log onto an administrator account to provision, monitor and/or maintain the system 100 of FIG. 1 or server 134 or 730.

Figure 10:
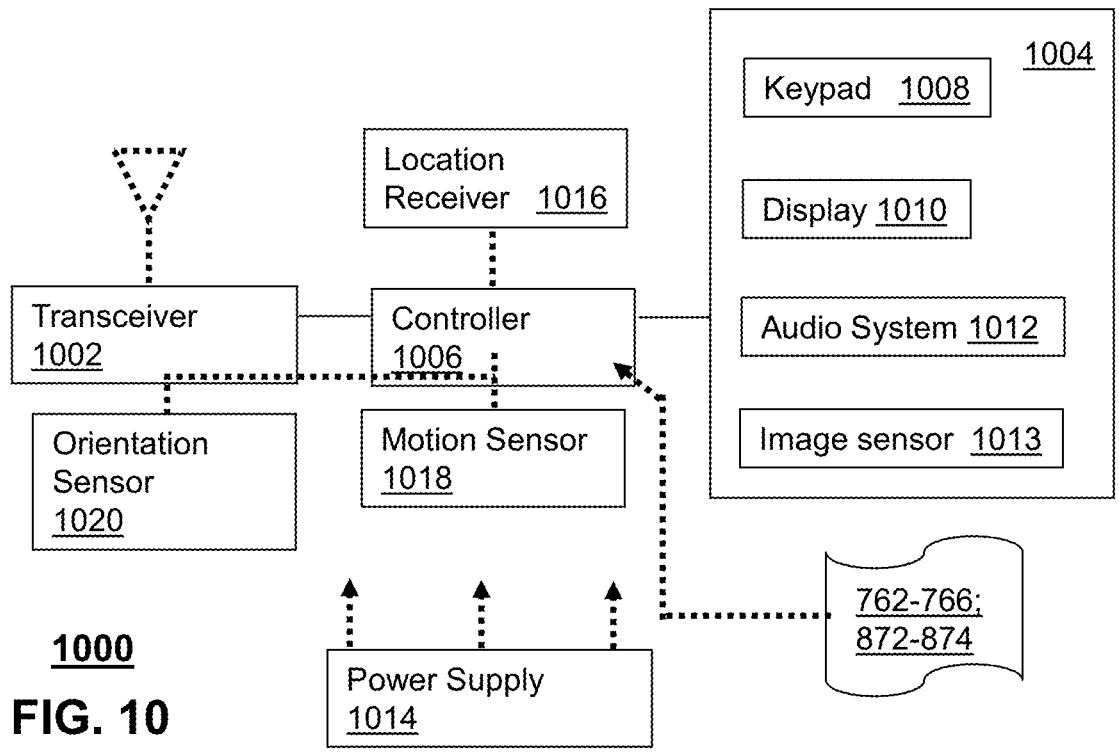
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIG. 1, and FIGS. 7-8 and can be configured to perform portions of method 600 of FIG. 6.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of devices of FIG. 1 such as devices 112, 116, 220, 124, 126, 142, and 146, the media processor 706, the media devices 708, or the portable communication devices 716 of FIG. 7, as well as the IMS CDs 802 and PSTN CDs 805 and 895 of FIG. 8. It will be appreciated that the communication device 1000 can also represent other devices that can operate in system 100 of FIG. 1, communication systems 700-800 of FIGS. 7-8 such as a gaming console and a media player. In addition, the controller 1006 can be adapted in various embodiments to perform the functions 762 and 872-874, respectively.

Upon reviewing the aforementioned embodiments, it would be evident to an artisan with ordinary skill in the art that said embodiments can be modified, reduced, or enhanced without departing from the scope of the claims described below. For example, a person of ordinary skill in the art can combine embodiments or portions of embodiments without departing from the scope of the claims. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
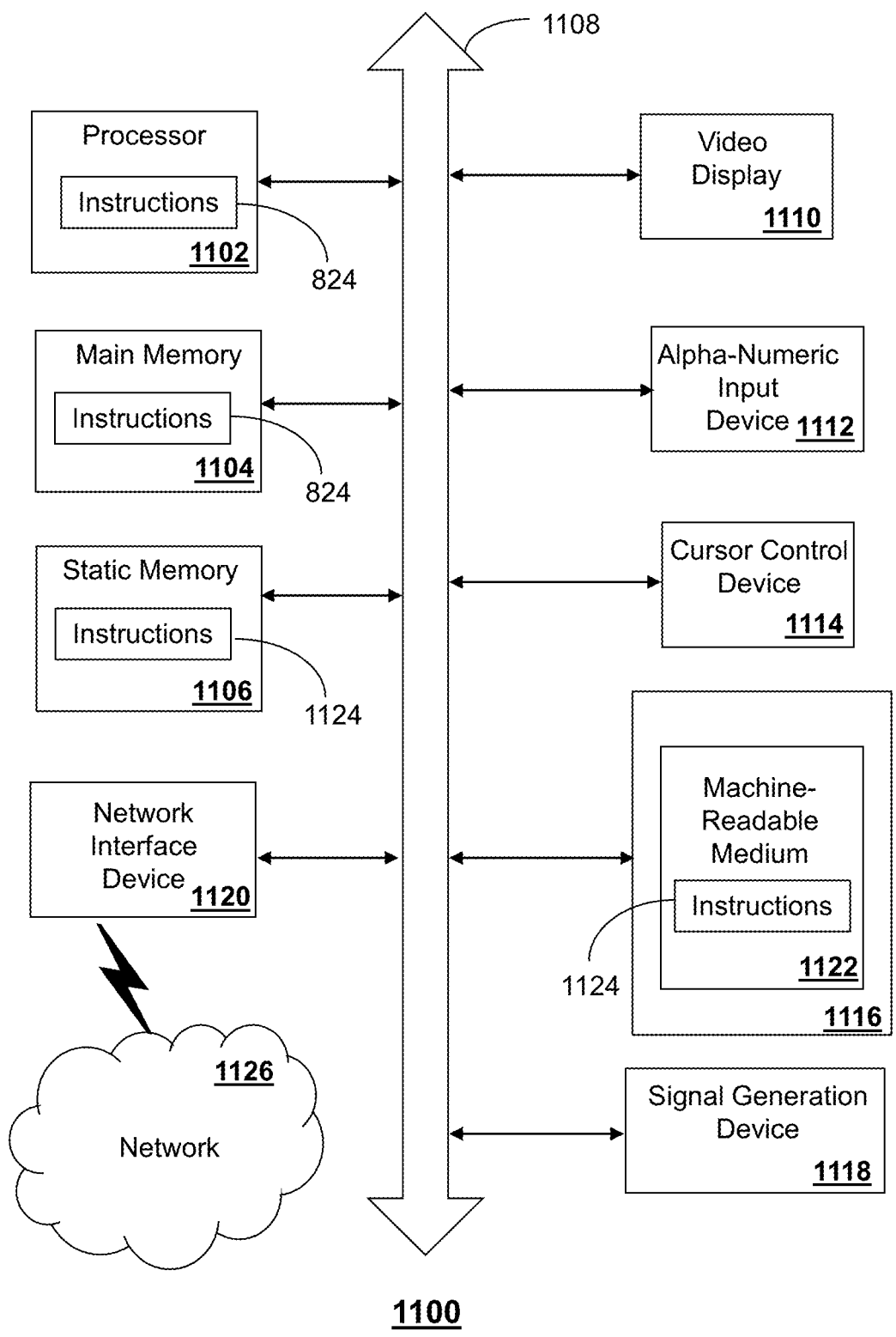
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the media content server 134 or 730, the communication devices 112, 116, 120, 124, 126, 142, 146, 716, 706, 708, 805, 895, and 802 and other devices of FIGS. 1-10. That is the machine can capture video streams of an event 102 and deliver those video streams to a media content server 1234 or 730. Further, the machine can be a media content server 134 or 730 that aggregates multiple video streams to generate a composite video stream. The media content server 134 or 730 can send the composite video stream with a graphical user interface to a device to present the composite video stream. Also, the media content server 134 or 730 can receive user input to adjust the composite video stream and send the composite video stream to a device to present the adjusted composite video stream. In addition, the machine can be a device that presents or causes to present the composite video stream or the adjusted composite video stream such as devices 142, 146, 706, and 708. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a processing system including a processor; and
a memory that stores executable instructions that, when executed by the processing system, facilitate performance of operations, comprising:
   obtaining a live video stream from each of a plurality of mobile phone devices resulting in a plurality of live video streams, the plurality of live video streams being associated with a common event, wherein each mobile phone device of the plurality of mobile phone devices is camera-enabled;
   aggregating the plurality of live video streams to generate a composite video stream for presenting the common event;
   sending the composite video stream to a communication device for a first presentation of the composite video stream of the common event on a first screen of the communication device;
   providing a graphical user interface to the communication device, wherein the graphical user interface is presented by the communication device with the presentation of the composite video stream of the common event;
   receiving a first user-generated input from the communication device via the graphical user interface, wherein the first user-generated input comprises a request to adjust the presentation of the common event by providing a selection of a moving object and a first change in location of the communication device;
   receiving a first change in geographic location of the communication device, wherein the communication device determines the first change in geographic location by detecting that the communication device has moved from a first geographic location to a second geographic location of the communication device and determining that the first geographic location is different than the second geographic location;
   determining the first change in geographic location indicates a user has moved closer to the moving object resulting in a determination;
   adjusting the composite video stream according to the selection of the moving object, the first change in geographic location to generate a first adjusted composite video stream, wherein the adjusting of the composite video stream comprises rendering the first adjusted composite video stream to show that the user has a change in virtual location from a first virtual location that corresponds to the first geographic location to a second virtual location that corresponds to the second geographic location and magnifying the moving object in response to the determination, wherein each image of the first adjusted composite video stream includes a magnification of the moving object within the common event; and
   providing the first adjusted composite video stream to the communication device for overlaying a second presentation of the first adjusted composite video stream of the common event on a second screen of the communication device that includes the magnification of the moving object simultaneously over the first presentation of the composite video stream on the first screen of the communication device.

2. The system of claim 1, wherein the operations further comprise:
   detecting a presentation capability of the communication device;
   determining that a group of the plurality of live video streams are from a same perspective of the common event; and
   selecting one of the group of the plurality of live video streams that are from the same perspective of the common event according to the presentation capability of the communication device, wherein the aggregating of the plurality of live video streams comprises aggregating one of the group of the plurality of live video streams to generate the composite video stream for presenting the common event.

3. The system of claim 1, wherein the obtaining of the live video stream from each of the plurality of mobile phone devices further comprises:
   identifying a first video stream from a first mobile phone device of the plurality of mobile phone devices and a second video stream from a second mobile phone device of the plurality of mobile phone devices providing a same perspective of the common event;
   identifying a first incentive to be provided to a first user associated with the first mobile phone device and identifying a second incentive to be provided to a second user associated with the second mobile phone device; and
   selecting the first video stream as one of the plurality of live video streams based on the first incentive being advantageous over the second incentive.

4. The system of claim 1, wherein the sending of the composite video stream further comprises transmitting the composite video stream to a social media server, wherein the social media server shares the composite video stream with a group of communication devices associated with social media members.

5. The system of claim 1, wherein the graphical user interface includes a touchscreen to receive the first user-generated input through contact with the touchscreen and a gesture, and wherein the graphical user interface enables adjustment of viewing of the common event.

6. The system of claim 5, wherein the operations further comprise:
   receiving second user-generated input from the communication device, wherein the second user-generated input comprises a first gesture with the touchscreen of the graphical user interface that indicates magnifying of the moving object on a separate screen, and wherein the second user-generated input comprises a second change in location of the communication device.

7. The system of claim 6, wherein the providing of the graphical user interface to the communication device further comprises providing a plurality of selectable moving objects within the common event, and wherein the receiving of the first user-generated input from the communication device further comprises receiving an indication of the moving object from the plurality of selectable moving objects within the common event.

8. The system of claim 7, wherein the adjusting of the composite video stream according to the first user-generated input further comprises:

identifying a portion of the plurality of live video streams that shows the moving object; and aggregating the portion of the plurality of live video streams to generate the first adjusted composite video stream, wherein the first adjusted composite video stream provides an adjusted view of the moving object.

9. The system of claim 1, wherein operations further comprise generating a 360 degree live virtual environment from the composite video stream.

10. The system of claim 9, wherein the sending the composite video stream further comprises sending the 360 degree live virtual environment to a virtual reality user device.

11. The system of claim 10, wherein the graphical user interface enables adjustment of a viewing of the common event.

12. A non-transitory, machine-readable storage medium, comprising executable instructions that, when executed by a processing system including a processor, facilitate performance of operations, comprising:

obtaining a live video stream from each of a plurality of mobile phone devices resulting in a plurality of live video streams, the plurality of live video streams being associated with a common event, wherein each mobile phone device of the plurality of mobile phone devices is camera-enabled;

aggregating the plurality of live video streams to generate a composite video stream for presenting the common event;

sending the composite video stream for a first presentation of the composite video stream of the common event to a social media server, wherein the social media server shares the composite video stream with a communication device of social media member, wherein the first presentation of the composite video stream of the common event is on a first screen of the communication device;

providing a graphical user interface to the communication device, wherein the graphical user interface is presented by the communication device with the presentation of the composite video stream of the common event;

receiving a first user-generated input from the communication device via the graphical user interface, wherein the first user-generated input comprises a request to adjust the presentation of the common event by providing a selection of a moving object and a first change in location of the communication device;

receiving a first change in geographic location of the communication device, wherein the communication device determines the first change in geographic location by detecting that the communication device has moved from a first geographic location to a second geographic location of the communication device and determining that the first geographic location is different than the second geographic location;

determining the first change in geographic location indicates a user has moved closer to the moving object resulting in a determination;

adjusting the composite video stream according to the selection of the moving object, the first change in geographic location, and to magnify the moving object in response to the determination to generate a first adjusted composite video stream, wherein the adjusting of the composite video stream comprises rendering the first adjusted composite video stream to show that the user has a change in virtual location from a first virtual location that corresponds to the first geographic location to a second virtual location that corresponds to the second geographic location and magnifying the moving object in response to the determination, wherein each image of the first adjusted composite video stream includes a magnification of the moving object within the common event; and providing the first adjusted composite video stream, via the social media server, to the communication device for overlaying a second presentation of the first adjusted composite video stream of the common event on a second screen of the communication device that includes the magnification of the moving object simultaneously over the first presentation of the composite video stream on the first screen of the communication device.

13. The non-transitory, machine-readable storage medium of claim 12, wherein the operations further comprise:

detecting a presentation capability of the communication device;

determining that a group of the plurality of live video streams are from a same perspective of the common event; and selecting one of the group of the plurality of live video streams that are from the same perspective of the common event according to the presentation capability of the communication device, wherein the aggregating the plurality of live video streams comprises aggregating one of the group of the plurality of live video streams to generate the composite video stream for presenting the common event.

14. The non-transitory, machine-readable storage medium of claim 12, wherein the operations further comprise providing additional bandwidth to a first mobile phone device based on the first mobile phone device providing a first live video stream, wherein the plurality of live video streams comprises the first live video stream.

15. The non-transitory, machine-readable storage medium of claim 12, wherein the graphical user interface includes a touchscreen to receive the first user-generated input through contact with the touchscreen and a gesture, and wherein the graphical user interface enables adjustment of viewing of the common event.

16. The non-transitory, machine-readable storage medium of claim 15, wherein the operations further comprise:

receiving second user-generated input from the communication device, wherein the second user-generated input comprises a first gesture with the touchscreen of the graphical user interface that indicates magnifying the moving object on a separate screen, and wherein the second user-generated input comprises a second change in location of the communication device.

17. The non-transitory, machine-readable storage medium of claim 12, wherein the providing of the graphical user interface to the communication device further comprises providing a plurality of selectable moving objects within the common event, and wherein the receiving of the first user-generated input from the communication device further comprises receiving an indication of the moving object from the plurality of selectable moving objects within the common event.

18. The non-transitory, machine-readable storage medium of claim 17, wherein the operations further comprise:

identifying a portion of the plurality of live video streams that shows the moving object; and aggregating the portion of the plurality of live video streams to generate the first adjusted composite video stream, wherein the first adjusted composite video stream provides an adjusted view of the moving object.

19. A method, comprising:

obtaining, by a processing system including a processor, a live video stream from each of a plurality of mobile phone devices resulting in a plurality of live video streams, the plurality of live video streams being associated with a common event, wherein each mobile phone device of the plurality of mobile phone devices is camera-enabled;

aggregating, by the processing system, the plurality of live video streams to generate a composite video stream for presenting the common event;

generating a 360 degree live virtual environment from the composite video stream sending, by the processing system, the 360 degree live virtual environment of the common event to a virtual reality user device for a first presentation of the 360 degree live virtual environment of the common event on a first screen of the virtual reality user device;

providing, by the processing system, a graphical user interface to the virtual reality user device, wherein the graphical user interface is presented by the virtual reality user device with the first presentation of the 360 degree live virtual environment of the common event;

receiving, by the processing system, a user-generated input from the virtual reality user device via the graphical user interface, wherein the user-generated input comprises a request to adjust the presentation of the common event by providing a selection of a moving object and a first change in location of the virtual reality user device;

receiving, by the processing system, a first change in geographic location of the virtual reality user device, wherein the virtual reality user device determines the first change in geographic location by detecting that the virtual reality user device has moved from a first geographic location to a second geographic location of the virtual reality user device and determining that the first geographic location is different than the second geographic location;

determining, by the processing system, the first change in geographic location indicates a user has moved closer to the moving object resulting in a determination;

adjusting, by the processing system, the 360 degree live virtual environment of the common event according to the selection of the moving object, the first change in geographic location to generate a first adjusted composite video stream, wherein the adjusting of the composite video stream comprises rendering the first adjusted composite video stream to show the user has a change in virtual location from a first virtual location that corresponds to the first geographic location to a second virtual location that corresponds to the second geographic location and magnifying the moving object in response to the determination wherein the first adjusted composite video stream comprises an adjusted 360 degree live virtual environment of the common event, wherein each image of the adjusted 360 degree live virtual environment of the common event includes a magnification of the moving object within the common event; and providing, by the processing system, the adjusted 360 degree live virtual environment of the common event to the virtual reality user device for overlaying a second presentation of the adjusted 360 degree live virtual environment of the common event on a second screen of the virtual reality user device that includes the magnification of the moving object simultaneously over the first presentation of the composite video stream on the first screen of the virtual reality user device.

20. The method of claim 19, wherein the sending of the composite video stream further comprises transmitting, by the processing system, the composite video stream to a social media server, wherein the social media server shares the composite video stream with a group of communication devices associated with social media members.

* * * * *